US012649518B2

(12) United States Patent     (10) Patent No.:   US 12,649,518 B2

Kalweit et al.     (45) Date of Patent:    Jun. 9, 2026

(54) STEER BY WIRE SYSTEM

(71) Applicant: GM Global Technology Operations LLC, Detroit, MI (US)

(72) Inventors: Nicholas J. Kalweit, Novi, MI (US); Michael C. Gaunt, Metamora, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 77 days.

(21) Appl. No.: 18/966,457

(22) Filed: Dec. 3, 2024

(65) Prior Publication Data

US 2026/0152228 A1     Jun. 4, 2026

(51) Int. Cl.
    *B62D 6/00*       (2006.01)
    *B62D 5/00*       (2006.01)

(52) U.S. Cl.
    CPC ............. *B62D 6/008* (2013.01); *B62D 5/006* (2013.01)

(58) Field of Classification Search
    CPC ................................. B62D 6/008; B62D 5/006
    See application file for complete search history.

(56) References Cited

U.S. PATENT DOCUMENTS

| | | | | |
|---|---|---|---|---|
| 6,176,341 B1 * | 1/2001 | Ansari | .................... | B62D 6/008 |
| | | | | 180/402 |
| 6,820,715 B2 | 11/2004 | Laurent et al. | | |
| 11,420,670 B2 * | 8/2022 | Shin | ........................ | B62D 5/005 |
| 2012/0179328 A1 * | 7/2012 | Goldman-Shenhar | ... | B62D 1/06 |
| | | | | 701/36 |

| | | | | |
|---|---|---|---|---|
| 2017/0291638 A1 * | 10/2017 | Gupta | .................. | B62D 15/025 |
| 2021/0371008 A1 * | 12/2021 | Hwang | .................. | B62D 5/005 |
| 2023/0202562 A1 * | 6/2023 | Lee | ........................ | B62D 6/002 |
| | | | | 701/41 |
| 2023/0219615 A1 * | 7/2023 | Lee | ........................ | B62D 5/003 |
| | | | | 701/42 |
| 2024/0227915 A1 * | 7/2024 | Arányi | .................. | B62D 5/001 |

(Continued)

FOREIGN PATENT DOCUMENTS

EP        0970000 A1     1/2000

OTHER PUBLICATIONS

Anwar, S. et al., "Analytical redundancy based predictive fault tolerant control of a steer-by-wire system using nonlinear observer", IEEE International Conference on Industrial Technology, 2010, pp. 477-482, Via del Mar Chile.

(Continued)

*Primary Examiner* — Sizo B Vilakazi

(74) *Attorney, Agent, or Firm* — Vivacqua Crane, PLLC

(57) ABSTRACT

A steering system includes a central controller having a primary control algorithm, a steering wheel actuator adapted to collect data related to a state of a steering wheel and communicate the data to the central controller, a tertiary steering wheel angle sensor adapted to collect data related to the state of the steering wheel and communicate the data to a redundant secondary controller, a road wheel actuator in communication with the central controller and the steering wheel actuator, having a secondary control algorithm stored therein, and adapted to collect data related to a state of the road wheel actuator and communicate the data to the central controller, and one of control a steering rack and steering of the vehicle based on the primary control algorithm, or control a steering rack and steering of the vehicle based on the secondary control algorithm.

20 Claims, 3 Drawing Sheets

(56)  References Cited

U.S. PATENT DOCUMENTS

| | | | |
|---|---|---|---|
| 2025/0042464 A1* | 2/2025 | Van Rooyen | ........ B62D 5/0418 |
| 2025/0091593 A1* | 3/2025 | Kasaiezadeh Mahabadi | .............. B60W 50/029 |

OTHER PUBLICATIONS

Jeong, S et al., "A Study on Handling Steering Angle Sensor Failure on Redundancy-Based EPS Systems," WCX SAE World Congress Experience, Apr. 9, 2024, Detroit, Michigan United States.
Zhang, H et al., "Tracking and Fault-Tolerant Controller Design for Uncertain Steer-by-Wire Systems Using Model Predictive Control", Chinese Journal of Mechanical Engineering, 2024, pp. 1-13, China.

* cited by examiner

STEER BY WIRE SYSTEM

INTRODUCTION

The present disclosure relates to a steer by wire system for a vehicle. Steer by wire consists of a steering wheel actuator, and a steering rack actuator wherein there is no mechanical connection between the steering wheel actuator and the steering rack actuator. Rather, signals from the steering wheel actuator are electronically communicated to the steering rack actuator. The steering wheel actuator generates the steering feel and communicates the driver's steering input "by-wire" quickly and precisely to the steering rack actuator, which steers the wheels, depending on the driving speed and conditions.

While current steer by wire systems achieve their intended purpose, there is a need for a new and improved system that provides robust redundancy to the steer by wire system.

SUMMARY

According to several aspects of the present disclosure, a steer by wire system includes a central controller having a primary control algorithm stored therein, a steering wheel actuator in communication with the central controller and adapted to collect data related to a state of a steering wheel and communicate the data to the central controller, a tertiary steering wheel angle sensor in communication with a redundant secondary controller and adapted to collect data related to the state of the steering wheel independently of the steering wheel actuator and communicate the data to the redundant secondary controller, a road wheel actuator in communication with the central controller and the steering wheel actuator, having a secondary control algorithm stored therein, and adapted to collect data related to a state of the road wheel actuator and communicate the data to the central controller; and one of control a steering rack and steering of the vehicle based on instructions received from the central controller using the primary control algorithm, or control a steering rack and steering of the vehicle based on instructions received from redundant secondary controller using the secondary control algorithm.

According to another aspect, the steering wheel actuator, the road wheel actuator, the central controller and the redundant secondary controller are adapted to communicate with one another via a first communication protocol, and the redundant secondary controller, the tertiary steering wheel angle sensor and the road wheel actuator are adapted to communicate with one another via a second communication protocol that is independent from the first communication protocol.

According to another aspect, the first communication protocol is an ethernet communication protocol.

According to another aspect, the second communication protocol is one of a Controller Area Network (CAN) or Local Interconnect Network (LIN) communication protocol.

According to another aspect, the steering wheel actuator includes a first electronic control unit adapted to independently collect data related to a state of the steering wheel and communicate the data to the central controller and the road wheel actuator via an first independent path of the ethernet communication protocol, and a second electronic control unit adapted to independently collect data related to a state of the steering wheel and communicate the data to the central controller and the road wheel actuator via a second independent path of the ethernet communication protocol.

According to another aspect, the road wheel actuator includes a first electronic control unit adapted to independently collect data related to a state of the road wheel actuator and communicate the data to the central controller via the first independent path of the ethernet communication protocol, and one of control the steering rack and steering of the vehicle based on instructions received from the central controller using the primary control algorithm via the first communication protocol, control the steering rack and steering of the vehicle based on instructions received from the redundant secondary controller via the second communication protocol and using the secondary control algorithm, control the steering rack and steering of the vehicle based on instructions determined by the first electronic control unit of the road wheel actuator based on raw data received from the tertiary steering wheel angle sensor via the second communication protocol using the secondary control algorithm, or control the steering rack and steering of the vehicle based on instructions determined by the first electronic control unit of the road wheel actuator based on raw data received from the steering wheel actuator via the first communication protocol, and a second electronic control unit adapted to independently collect data related to a state of the road wheel actuator and communicate the data to the central controller via the second independent path of the ethernet communication protocol, and one of control the steering rack and steering of the vehicle based on instructions received from the central controller using the primary control algorithm, control the steering rack and steering of the vehicle based on instructions received from the redundant secondary controller via the second communication protocol and using the secondary control algorithm, control the steering rack and steering of the vehicle based on instructions determined by the second electronic control unit of the road wheel actuator based on raw data received from the tertiary steering wheel angle sensor via the second communication protocol using the secondary control algorithm, or control the steering rack and steering of the vehicle based on instructions determined by the second electronic control unit of the road wheel actuator based on raw data received from the steering wheel actuator via the first communication protocol, and wherein, each of the first electronic control unit and the second electronic control unit of the road wheel actuator includes a copy of the secondary control algorithm stored therein.

According to another aspect, the system further includes a first power grid and a second power grid independent from the first power grid, and wherein, the central controller is powered by both of the first power grid and the second power grid, the first electronic control unit of the steering wheel actuator and the first electronic control unit of the road wheel actuator are powered by the first power grid, the second electronic control unit of the steering wheel actuator and the second electronic control unit of the road wheel actuator are powered by the second power grid, and the redundant secondary controller and the tertiary steering wheel angle sensor are powered by either one of the first power grid or the second power grid.

According to another aspect, the first power grid is connected to a first independent high voltage power source within the vehicle, and the second power grid is connected to a second independent high voltage power source within the vehicle.

According to another aspect, the steering wheel includes a feedback motor in communication with the steering wheel actuator and controlled by the first electronic control unit of the steering wheel actuator and the second electronic control unit of the steering wheel actuator, the feedback motor connected to the steering wheel via a gear box and adapted to provide torque feedback at the steering wheel, and provide passive feedback at the steering wheel to provide resistance and dampening of the steering wheel when the feedback motor is not powered.

According to another aspect, the road wheel actuator includes a steering motor in communication with the road wheel actuator and controlled by the first electronic control unit of the road wheel actuator and the second electronic control unit of the road wheel actuator, and a steering rack, the steering rack adapted to convert rotary motion of the steering motor to linear motion of the steering rack and turn wheels of the vehicle via tie rods interconnecting the steering rack and the wheels of the vehicle.

According to another aspect, the central controller further includes a torque vectoring steering control algorithm stored therein, wherein the central controller is adapted to receive data related to steering wheel from at least one of the first electronic control unit of the steering wheel actuator via the first path of the ethernet communication protocol, the second electronic control unit of the steering wheel actuator via the second path of the ethernet communication protocol, and the tertiary steering wheel angle sensor via the ethernet communication protocol, and actuate at least one of a brake system, a propulsion system, and the road wheel actuator to influence lateral motion of the vehicle utilizing the torque vectoring steering control algorithm.

According to another aspect, the system further includes at least one first switch adapted to selectively interconnect the first path of the ethernet communication protocol to the central controller and at least one second switch adapted to selectively interconnect the second path of the ethernet communication protocol to the central controller.

According to another aspect, the primary control algorithm includes a full set of control features and the secondary control algorithm includes a reduced set of control features.

According to several aspects of the present disclosure, a method of controlling a steer by wire steering system includes collecting, with a steering wheel actuator in communication with a central controller having a primary control algorithm stored therein, data related to a state of a steering wheel, and communicating, with the steering wheel actuator, the data to the central controller, collecting, with a tertiary steering wheel angle sensor in communication with a redundant secondary controller and the central controller, data related to the state of the steering wheel independently of the steering wheel actuator, and communicating the data to the redundant secondary controller and the central controller, collecting, with a road wheel actuator in communication with the central controller and the steering wheel actuator and having a secondary control algorithm stored therein, data related to a state of the road wheel actuator, communicating, with the road wheel actuator, the data to the central controller; and one of controlling, with the road wheel actuator, a steering rack and steering of the vehicle based on instructions received from the central controller using the primary control algorithm, controlling, with the road wheel actuator, a steering rack and steering of the vehicle based on instructions received from redundant secondary controller using the secondary control algorithm, controlling, with the road wheel actuator, a steering rack and steering of the vehicle based on instructions determined by the road wheel actuator based on raw data received from the tertiary steering wheel angle sensor via the second communication protocol using the secondary control algorithm, or controlling, with the road wheel actuator, a steering rack and steering of the vehicle based on instructions determined by the road wheel actuator based on raw data received from the steering wheel actuator via the first communication protocol.

According to another aspect, the method further includes enabling, with an ethernet communication protocol, communication between the steering wheel actuator, the road wheel actuator, the central controller and the redundant secondary controller, and enabling, with one of a Controller Area Network (CAN) or a Local Interconnect Network (LIN) communication protocol, communication between the redundant secondary controller, the tertiary steering wheel angle sensor and the road wheel actuator.

According to another aspect, the collecting, with the steering wheel actuator in communication with the central controller having the primary control algorithm stored therein, data related to the state of the steering wheel, and communicating, with the steering wheel actuator, the data to the central controller further includes collecting, independently, with a first electronic control unit of the steering wheel actuator, data related to the state of the steering wheel, and communicating the data to the central controller and the road wheel actuator via a first independent path of the ethernet communication protocol, and collecting, independently, with a second electronic control unit of the steering wheel actuator, data related to the state of the steering wheel, and communicating the data to the central controller and the road wheel actuator via a second independent path of the ethernet communication protocol.

According to another aspect, the collecting, with the road wheel actuator in communication with the central controller and the steering wheel actuator and having the secondary control algorithm stored therein, data related to a state of the road wheel actuator further includes, one of collecting, independently, with a first electronic control unit of the road wheel actuator data related to the state of the road wheel actuator, and communicating the data to the central controller via the first independent path of the ethernet communication protocol, or collecting, independently, with a second electronic control unit of the road wheel actuator data related to the state of the road wheel actuator, and communicating the data to the central controller via the second independent path of the ethernet communication protocol, wherein, each of the first electronic control unit and the second electronic control unit of the road wheel actuator includes a copy of the secondary control algorithm stored therein.

According to another aspect, the method further includes providing power to the central controller from both of a first power grid and a second power grid, providing power to the first electronic control unit of the steering wheel actuator and the first electronic control unit of the road wheel actuator from the first power grid, providing power to the second electronic control unit of the steering wheel actuator and the second electronic control unit of the road wheel actuator from the second power grid, and providing power to the redundant secondary controller and the tertiary steering wheel angle sensor from either one of the first power grid or the second power grid.

According to another aspect, the method further includes providing torque feedback at the steering wheel with a feedback motor connected to the steering wheel via a gear box, in communication with the steering wheel actuator and controlled by the first electronic control unit of the steering wheel actuator and the second electronic control unit of the steering wheel actuator, and providing, with the feedback motor, passive feedback at the steering wheel to provide resistance and dampening of the steering wheel when the feedback motor is not powered.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
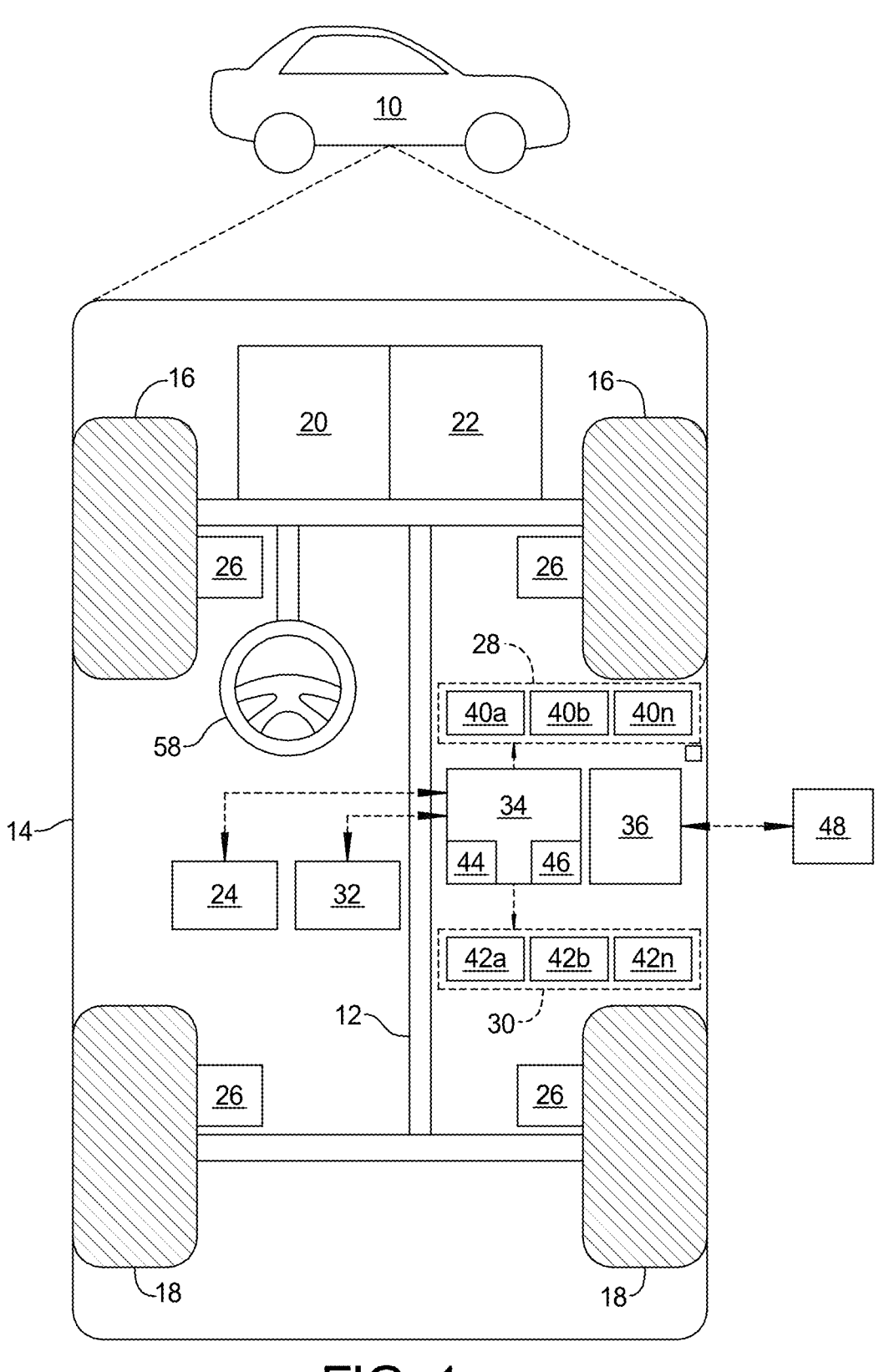
FIG. 1 is a schematic diagram of a vehicle including a steering system according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: 4 (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about", with reference to percentages, comprises a variation of plus/minus 5%, "about", with reference to temperatures, comprises a variation of plus/minus five degrees, and "about", with reference to distances, comprises plus/minus 10%. In addition, disclosure of ranges includes disclosure of all values and further divided ranges within the entire range, including endpoints and sub-ranges given for the ranges. In addition, disclosure of ranges includes disclosure of all values and further divided ranges within the entire range, including endpoints and sub-ranges given for the ranges.

Example embodiments will now be described more fully with reference to the accompanying drawings. In accordance with an exemplary embodiment, FIG. 1 shows a vehicle 10 with an associated steering system 24 adapted to provide audible notification to a user within the vehicle 10 when braking sub-systems within the vehicle 10 are actuated. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system 50 is incorporated into the autonomous vehicle 10. An autonomous vehicle 10 is, for example, a vehicle 10 that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the vehicle 10 is equipped with a so-called Level Four automation system. A Level Four system indicates "high automation", referring to the driving mode-specific performance by an automated driving system of all aspects of the dynamic driving task, even if a human user does not respond appropriately to a request to intervene. A level four autonomous vehicle may be operated in a manual mode, wherein a drive within the vehicle 10 operates the vehicle 10 just as in a non-autonomous vehicle, and in an autonomous mode, wherein certain or all aspects of driving control are automated. The novel aspects of the present disclosure are also applicable to non-autonomous vehicles.

As shown, the vehicle 10 generally includes a propulsion system 20, a transmission system 22, a steering system 24, a brake system 26, a sensor system 28, an actuator system 30, at least one data storage device 32, a vehicle controller 34, and a wireless communication module 36. In an embodiment in which the vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The cameras can include two or more digital cameras spaced at a selected distance from each other, in which the two or more digital cameras are used to obtain stereoscopic images of the surrounding environment in order to obtain a three-dimensional image or map. The plurality of sensing devices 40a-40n is used to determine information about an environment surrounding the vehicle 10. In an exemplary embodiment, the plurality of sensing devices 40a-40n includes at least one of a motor speed sensor, a motor torque sensor, an electric drive motor voltage and/or current sensor, an accelerator pedal position sensor, brake pedal position sensor, a coolant temperature sensor, a cooling fan speed sensor, and a transmission oil temperature sensor.

The vehicle controller 34 includes at least one processor 44 and a computer readable storage device or media 46. The at least one data processor 44 can be any custom made or commercially available processor, a central processing unit (CPU), a graphics processing unit (GPU), an auxiliary processor among several processors associated with the vehicle controller 34, a semi-conductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one data processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the vehicle controller 34 are embodied in a trajectory planning system and, when executed by the at least one data processor 44, generates a trajectory output that addresses kinematic and dynamic constraints of the environment. For example, the instructions receive as input process sensor and map data. The instructions perform a graph-based approach with a customized cost function to handle different road scenarios in both urban and highway roads.

The wireless communication module 36 is configured to wirelessly communicate information to and from other remote entities 48, such as but not limited to, other vehicles ("V2V" communication,) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle controller 34 is a non-generalized, electronic control device having a preprogrammed digital computer or processor, memory or non-transitory computer readable medium used to store data such as control logic, software applications, instructions, computer code, data, lookup tables, etc., and a transceiver [or input/output ports]. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Figure 2:
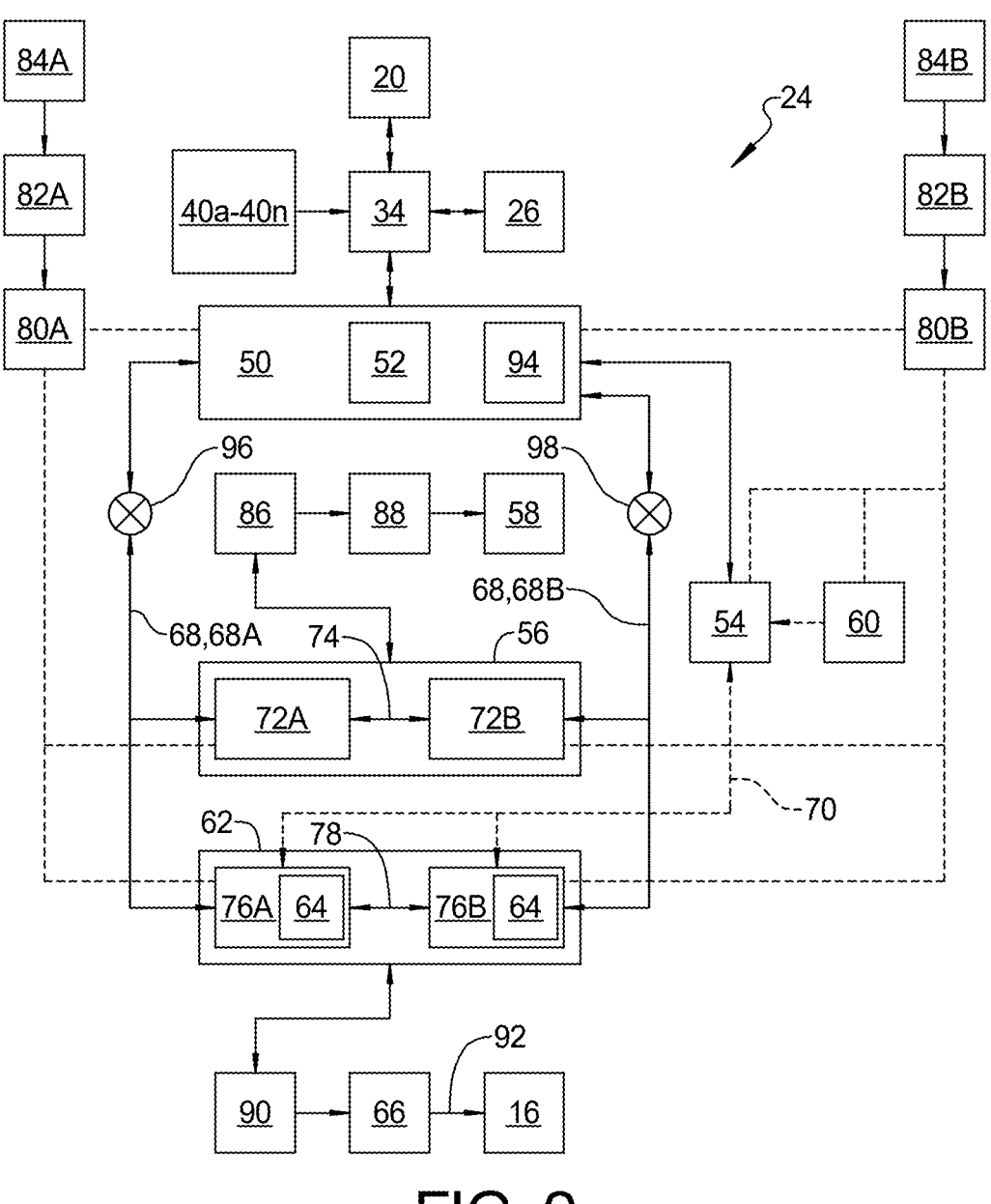
FIG. 2 is a schematic diagram of the steering system.

Referring to FIG. 1 and FIG. 2, the steering system 24 influences a position of the front wheels 16 and rear wheels 18. In an exemplary embodiment, the steering system 24 includes a central controller 50 having a primary control algorithm 52 stored therein and a redundant secondary controller 54. The central controller 50 is in communication with a steering wheel actuator 56. The steering wheel actuator 56 is adapted to collect data related to a state of a steering wheel 58 such as the steering wheel angle, torque applied to the steering wheel and velocity of rotation of the steering wheel, and communicate the data to the central controller 50. The plurality of sensors 40a-40n include sensors adapted to measure the steering wheel angle, torque applied to the steering wheel and velocity of rotation of the steering wheel 58, and communicate this data to the steering wheel actuator 56.

A tertiary steering wheel angle sensor 60 is in communication with the redundant secondary controller 54 and adapted to collect data related to the state of the steering wheel 58 independently of the steering wheel actuator 56 and communicate the data to the redundant secondary controller 54.

A road wheel actuator 62 is in communication with the central controller 50 and the steering wheel actuator 56, and includes a secondary control algorithm 64 stored therein, and is adapted to collect data related to a state of the road wheel actuator 62, such as position of a steering rack 66 and estimated torque acting on the steering rack 66, and communicate the data to the central controller 50, and one of 1) control the steering rack 66 and steering of the vehicle 10 based on instructions received from the central controller 50 using the primary control algorithm 52, or 2) control the steering rack 66 and steering of the vehicle 10 based on instructions received from the redundant secondary controller 54 using the secondary control algorithm 64.

This provides a back-up in a scenario where a failure within the steering system 24 prevents control of the steering rack 66 by the central controller 50 using the primary control algorithm 52, wherein control of the steering rack 66 comes from the redundant secondary controller 54 using the secondary control algorithm 64. In an exemplary embodiment, the primary control algorithm 52 includes a full set of control features adapted to control the steering rack 66 under all anticipated operating conditions and providing all options. The secondary control algorithm 64 includes a reduced set of control features, adapted to provide limited control features when control via the primary control algorithm is not available. The reduced set of control features provides basic control of the steering system 24 until the vehicle 10 reaches a destination, is able to maneuver off a roadway, or until the steering system 24 can be serviced to repair the malfunction preventing usage of the primary control algorithm 52. Thus, the steering system 24 has redundancy by having two separate control algorithms (primary control algorithm 52, secondary control algorithm 64) that operate independently of one another and are stored in different locations within the steering system 24, thus ensuring that a failure causing inability to use the primary control algorithm 52 can be temporarily remedies by usage of the secondary control algorithm 64.

In an exemplary embodiment, the steering wheel actuator 56, the road wheel actuator 62, the central controller 50 and the redundant secondary controller 54 are adapted to communicate with one another via a first communication protocol 68, and the redundant secondary controller 54, the tertiary steering wheel angle sensor 60 and the road wheel actuator 62 are adapted to communicate with one another via a second communication protocol 70 that is different from and independent of the first communication protocol 68. The tertiary steering wheel angle sensor 60 is adapted to communicate with both the road wheel actuator 62 and the central controller 50 via the redundant secondary controller 54. The road wheel actuator 62 also receives data from the steering wheel actuator 56. In an exemplary embodiment, the first communication protocol 68 and the second communication protocol 70 are different system types, wherein different failure modes apply to each. Thus, in the event of failure of the first communication protocol 68, the second communication protocol 70 will likely remain unaffected and operational, and likewise, in the event of failure of the second communication protocol 70, the first communication protocol 68 will likely remain unaffected and operational. Thus, the steering system 24 has redundant communication protocols 68, 70 that ensure communication between the components of the steering system 24, and operation of the steering system 24, is capable in the event of a single point failure of either one of the first communication protocol 68 and the second communication protocol 70.

In an exemplary embodiment, the first communication protocol 68 is an ethernet communication protocol. Ethernet is a common protocol used today for communications between systems and operates at the first two levels of the open systems interconnection (OSI) model (physical and data link). Ethernet has a variety of speeds available (10 megabits per second (Mbps), 100 Mbps, 1000 Mbps (also called Gigabit), and 10 GbE) and can use many different types of cable. These combinations of cable and speed all fall under various permutations of Ethernet, such as 100 BaseTX (100 Mbps using Category 5 cabling) or 1000BaseLX (1000 Mbps using optical fiber cabling), but they're all technically still Ethernet and follow specific standards for the two OSI model layers that they operate at.

In another exemplary embodiment, the second communication protocol 70 is one of a Controller Area Network (CAN) or Local Interconnect Network (LIN) communication protocol. CAN is a communication protocol used by various electronic devices. CAN is often used to provide communications between devices in vehicles, like engine management systems, active suspension, automatic braking systems, gear shift control, lighting control, air conditioning, airbags, central locking system, and other systems found in a vehicle. CAN is a high integrity serial data communication bus ideal for real-time applications. The bus can operate at data rates of up to 1 Mbps and has excellent error detection and correction capabilities. CAN is used in many industrial automation and control applications. CAN is a multi-master, message-based protocol. This means that all the CAN interconnected devices can transmit data, and several CAN devices can request the use of the bus simultaneously. A CAN network has no addressing system and instead uses a prioritized message system. All the messages are divided into a range of priorities. Multiple versions of CAN are available, including, but not limited to CAN 2.0A, which uses an 11-bit message identifier, CAN 2.0B, which uses a 29-bit message identifier, and CAN FD, which uses a flexible data rate. In a CAN bus, a transmitting device sends a message to all the CAN nodes, and each node decides how to react to the received message. Also, the nodes determine each message's priority if several messages are sent at the same time.

LIN is an electronic communication protocol primarily used in vehicles similar to CAN. The LIN communication network is a master-slave arrangement. Typically, the LIN bus consists of 16 nodes (1 master and 15 slaves). All the LIN bus messages are initiated by the single master. At the same time, only one slave may respond at any time to a message chosen using an identifier sent by the master. Data is transferred between the devices connected to the LIN bus using fixed form messages of variable length. The master device transmits a break signal followed by synchronization and identifier fields to initiate data transfer. The slave devices can reply by sending a data frame that contains either 2, 4, or 8 bytes of data plus 3 bytes of control information. LIN may be used as a sub-bus connected to a CAN bus. The CAN bus sends a signal to one of its nodes, which can itself be a LIN master. When the LIN physical layer transmitter receives the message, it converts it at a logic level to the LIN protocol using the CAN battery voltage level (typically 12 V). The LIN transmitter also includes a current-limited wave-shaping driver, which reduces electromagnetic emissions.

In an exemplary embodiment, to provide further redundancy within the steering system 24, the steering wheel actuator 56 includes a first electronic control unit 72A adapted to independently collect data related to a state of the steering wheel 58 and communicate the data to the central controller 50 and the road wheel actuator 62 via a first independent path 68A of the ethernet communication protocol 68, and a second electronic control unit 72B adapted to independently collect data related to a state of the steering wheel 58 and communicate the data to the central controller 50 and the road wheel actuator 62 via a second independent path 68B of the ethernet communication protocol 68. Each of the first electronic control unit 72A and the second electronic control unit 72B of the steering wheel actuator 56 is capable of communicating with one another via an internal communication link 74 and independently collecting data and communicating with the central controller 50 and road wheel actuator 62 to support the steering system 24 in the event of a single point failure of one of the first electronic control unit 72A and the second electronic control unit 72B of the steering wheel actuator 56.

In an exemplary embodiment, the steering system 24 further includes a first switch 96 adapted to selectively interconnect the first path 68A of the ethernet communication protocol 68 to the central controller 50 and a second switch 98 adapted to selectively interconnect the second path 68B of the ethernet communication protocol 68 to the central controller 50. Thus, during operation, the central controller 50 can selectively actuate the first and second switches 96, 98 to route communication through either the first path 68A of the ethernet communication protocol 68 or the second path 68B of the ethernet communication network 68.

In another exemplary embodiment, to provide additional redundancy within the steering system 24, the road wheel actuator 62 includes a first electronic control unit 76A adapted to independently collect data related to a state of the road wheel actuator 62 and communicate the data to the central controller 50 via the first independent path 68A of the ethernet communication protocol 68, and one of 1) control the steering rack 66 and steering of the vehicle 10 based on instructions received from the central controller 50 using the primary control algorithm 52, 2) control the steering rack 66 and steering of the vehicle 10 based on instructions received from the redundant secondary controller 54 using the secondary control algorithm 64 via the second communication protocol 70, 3) control the steering rack 66 and steering of the vehicle 10 based on instructions determined by the first electronic control unit 76A of the road wheel actuator 62 based on raw data received from the tertiary steering wheel angle sensor 60 via the second communication protocol 70 using the secondary control algorithm 64, or, 4) control the steering rack 66 and steering of the vehicle 10 based on instructions determined by the first electronic control unit 76A of the road wheel actuator 62 based on raw data received from the steering wheel actuator 56 via the first communication protocol 68.

The road wheel actuator 62 further includes a second electronic control unit 76B adapted to independently collect data related to a state of the road wheel actuator 62 and communicate the data to the central controller 50 via the second independent path 68B of the ethernet communication protocol 68, and one of 1) control the steering rack 66 and steering of the vehicle 10 based on instructions received from the central controller 50 using the primary control algorithm 52 via the ethernet communication protocol, 2) control the steering rack 66 and steering of the vehicle 10 based on instructions received from redundant secondary controller 54 using the secondary control algorithm 64 via the second communication protocol 70, 3) control the steering rack 66 and steering of the vehicle 10 based on instructions determined by the second electronic control unit 76B of the road wheel actuator 62 based on raw data received from the tertiary steering wheel angle sensor 60 via the second communication protocol 70 using the secondary control algorithm 64, or, 4) control the steering rack 66 and steering of the vehicle 10 based on instructions determined by the second electronic control unit 76B of the road wheel actuator 62 based on raw data received from the steering wheel actuator 56 via the first communication protocol 68.

Each of the first electronic control unit 76A and the second electronic control unit 76B of the road wheel actuator 62 includes a copy of the secondary control algorithm 64 stored therein and is capable of communicating with one another via an internal communication link 78 and independently collecting data and communicating with the central controller 50 and controlling the steering rack 66 and steering of the vehicle 10 to support the steering system 24 in the event of a single point failure of one of the first electronic control unit 76A and the second electronic control unit 76B of the road wheel actuator 62.

In another exemplary embodiment, to provide added redundancy, the steering system 24 further includes a first power grid 80A and a second power grid 80B independent from the first power grid 80A. The central controller 50 is powered by both of the first power grid 80A or the second power grid 80B. The first electronic control unit 72A of the steering wheel actuator 56 and the first electronic control unit 76A of the road wheel actuator 62 are powered by the first power grid 80A. The second electronic control unit 72B of the steering wheel actuator 56 and the second electronic control unit 76B of the road wheel actuator 62 are powered by the second power grid 80B. The redundant secondary controller 54 and the tertiary steering wheel angle sensor 60 are powered by either one of the first power grid or the second power grid. In an exemplary embodiment, the first power grid 80A utilizes a first auxiliary power module 82A or a battery connected to a first independent high voltage power source 84A within the vehicle 10, and the second power grid 80B utilizes a second auxiliary power module 82B or a battery connected to a second independent high voltage power source 84B within the vehicle 10. The first and second power grids 80A, 80B may utilize either an auxiliary power module 82A, 82B, a battery or both.

The steering wheel 58 includes a feedback motor 86 in communication with the steering wheel actuator 56 and controlled by the first electronic control unit 72A of the steering wheel actuator 56 and the second electronic control unit 72B of the steering wheel actuator 56. The first electronic control unit 72A of the steering wheel actuator 56 and the second electronic control unit 72 of the steering wheel actuator 56 are coordinated, each controlling half of the phases of the feedback motor 86. The feedback motor 86 is connected to the steering wheel 58 via a gear box 88 and adapted to provide active feedback to the operator at the steering wheel 58, and provide passive feedback at the steering wheel 58 to provide resistance and dampening of the steering wheel 58 when the feedback motor 86 is not powered.

Drivers use torque feedback at the steering wheel 58 to obtain information about the road and tire dynamics. This aids a driver in driving tasks like curve negotiation. Steer-by-wire vehicles, due to the mechanical decoupling of the front tires and steering wheel, do not have any inherent steering feedback and require an artificial steering feel. One way to implement an artificial steering feel is to synthesize steering feedback with the feedback motor 86.

In another exemplary embodiment, the road wheel actuator 62 includes a steering motor 90 in communication with the road wheel actuator 62 and controlled by the first electronic control unit 76A of the road wheel actuator 62 and the second electronic control unit 76B of the road wheel actuator 62, and the steering rack 66. The first electronic control unit 76A of the road wheel actuator 62 and the second electronic control unit 76B of the road wheel actuator 62 are coordinated, each controlling half the phases of the steering motor 90. The steering rack 66 adapted to convert rotary motion of the steering motor 90 to linear motion of the steering rack 66 and turn wheels 16 of the vehicle 10 via tie rods 92 interconnecting the steering rack 66 and the wheels 16 of the vehicle 10.

In another exemplary embodiment, the central controller 50 further includes a torque vectoring steering control algorithm 94 stored therein. The central controller 50 is adapted to receive data related to the steering wheel from at least one of the first electronic control unit 72A of the steering wheel actuator 56 via the first path 68A of the ethernet communication protocol 68, the second electronic control unit 72B of the steering wheel actuator 56 via the second path 68B of the ethernet communication protocol 68, and the tertiary steering wheel angle sensor 60 via the ethernet communication protocol 68, and to actuate at least one of the brake system 26, the propulsion system 20, and the road wheel actuator 62 to influence lateral motion of the vehicle 10 utilizing the torque vectoring steering control algorithm 94.

The torque vectoring steering control algorithm 94 is a backup used to steer the vehicle 10 if the steer-by-wire features of the steering system 24 fail after multiple single point failures. For example, if the road wheel actuator 62 cannot be controlled, the torque vectoring steering control algorithm 94 will steer the vehicle 10 for a short period of time (less than a minute) to help the driver get the vehicle 10 to the side of the road. When the steering system 24 is in a condition where a single additional single point failure could result in loss of steering control, the central controller 50 is adapted to allow continued vehicle 10 operation only for as long as is necessary. In other words, when there are failures present, and the steering system 24 continues operating with one or more of the redundancy features described herein, and a single additional failure could result in the in-ability of the central controller 50 to understand the driver's intended direction or the in-ability to control the vehicle 10 to achieve that intent, the central controller 50, via communication with the vehicle controller 34, limits operation of the vehicle further (cut propulsion power if the vehicle is moving) and allows the driver to steer the vehicle off the road and to a stop as quickly as possible with the remaining capability, wherein, the vehicle is no longer allowed to operate until the steering system 24 is serviced.

The torque vectoring steering control algorithm 94 uses, for example, the individual brakes to steer the vehicle 10. For example, the left front brake can be actuated to steer the vehicle 10 based on the driver turning the steering wheel 58 to the left and reading his intention, using the tertiary steering wheel angle sensor 60, to turn left. The individual brakes are applied to "steer-by-braking" in the event the steer-by-wire features of the steering system 24 fail. The torque vectoring steering control algorithm 94 can further use the propulsion system 20 (engine, electric motors) and, if equipped, active rear steering (an actuator that steers the rear wheels of the vehicle 10) to improve and refine the steering control. If only the brake system 26 is used, the vehicle 10 is trying to be steered, but at the same time, might be slowing down faster than desired. The propulsion system 20 can help control the deceleration.

Thus, the steering system 24 can tolerate several major failures in the components needed to communicate the driver's intended direction and it can use actuators other than the steering rack 66 to maintain lateral control. By providing redundancy in the measurement of the driver's intended direction, the mechanisms that can control the vehicle 10, the logic to turn the driver's intended direction into a command to these other mechanisms, and the distribution of that logic across multiple electronic control units 72A, 72B, 76A, 76B, the steering system 24 can continue to operate, even in the presence of multiple failures. This greatly improves functional reliability of the steering system 24 and, consequently, the entire vehicle 10.

Figure 3:
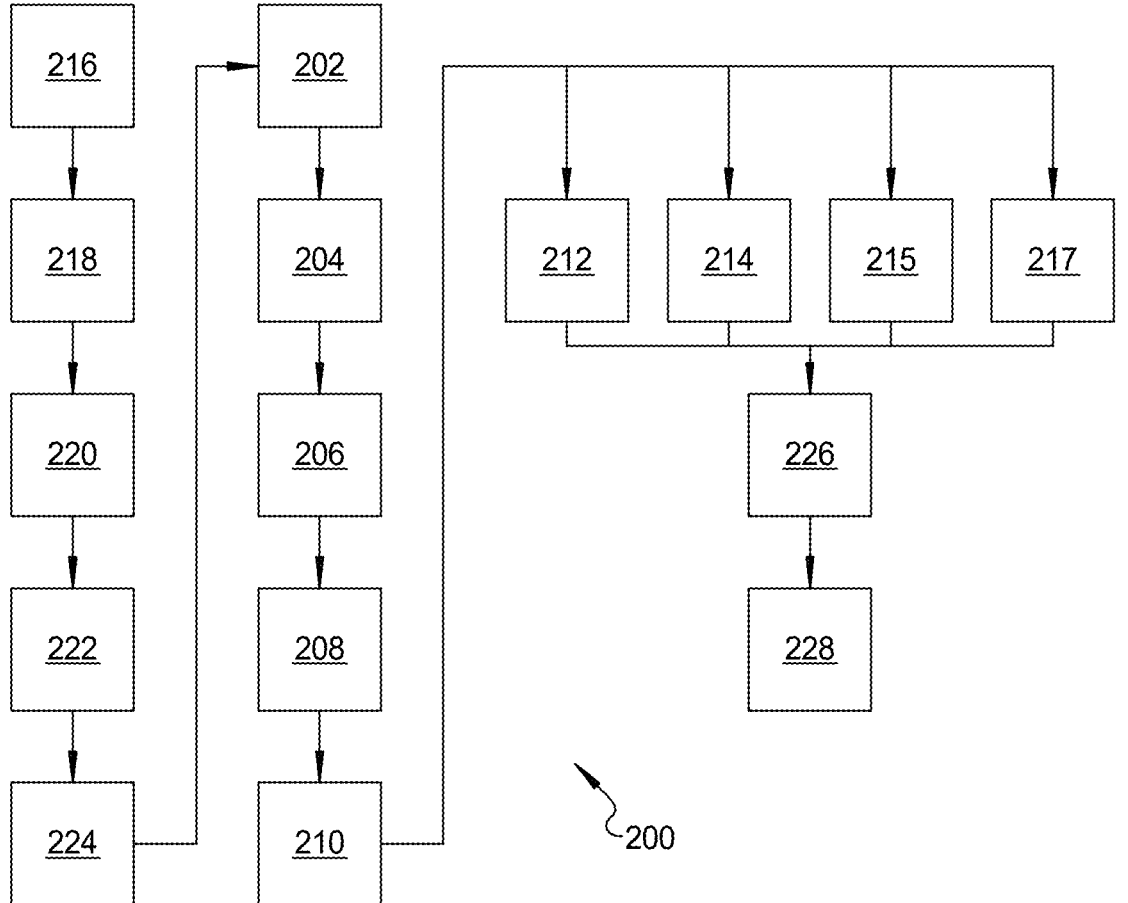
FIG. 3 is a flow chart illustrating a method of operating the steering system of FIG. 1.

Referring to FIG. 3, a method 200 of controlling a steering system 24 includes, starting at block 202, collecting, with a steering wheel actuator 56 in communication with a central controller 50 having a primary control algorithm 52 stored therein, data related to a state of a steering wheel 58 and, moving to block 204, communicating, with the steering wheel actuator 56, the data to the central controller 50, moving to block 206, collecting, with a tertiary steering wheel angle sensor 60 in communication with a redundant secondary controller 54, data related to the state of the steering wheel 58 independently of the steering wheel actuator 56, and communicating the data to the redundant secondary controller 54, moving to block 208, collecting, with a road wheel actuator 62 in communication with the central controller 50 and the steering wheel actuator 56 and having a secondary control algorithm 64 stored therein, data related to a state of the road wheel actuator 62, moving to block 210, communicating, with the road wheel actuator, the data to the central controller; and one of, moving to block 212, controlling, with the road wheel actuator 62, a steering rack 66 and steering of the vehicle 10 based on instructions received from the central controller 50 using the primary control algorithm 52, or, moving to block 214, controlling, with the road wheel actuator 62, a steering rack 66 and steering of the vehicle 10 based on instructions received from the redundant secondary controller 54 using the secondary control algorithm 64, or, moving to block 215, controlling the steering rack 66 and steering of the vehicle 10 based on instructions determined by the road wheel actuator 62 based on raw data received from the tertiary steering wheel angle sensor 60 via the second communication protocol 70 using the secondary control algorithm 64, or, moving to block 217, controlling the steering rack 66 and steering of the vehicle 10 based on instructions determined by the road wheel actuator 62 based on raw data received from the steering wheel actuator 56 via the first communication protocol 68.

In an exemplary embodiment the method 200 further includes, moving to block 216, enabling, with an ethernet communication protocol 68, communication between the steering wheel actuator 56, the road wheel actuator 62, the central controller 50 and the redundant secondary controller 54, and, moving to block 218, enabling, with one of a Controller Area Network (CAN) or a Local Interconnect Network (LIN) communication protocol 70, communication between the redundant secondary controller 54, the tertiary steering wheel angle sensor 60 and the road wheel actuator 62.

In an exemplary embodiment, the collecting, with a steering wheel actuator 56 in communication with a central controller 50 having a primary control algorithm 52 stored therein, data related to a state of a steering wheel 58 at block 202 and the communicating, with the steering wheel actuator 56, the data to the central controller 50 at block 204 further includes collecting, independently, with a first electronic control unit 72A of the steering wheel actuator 56, data related to the state of the steering wheel 58 and communicating the data to the central controller 50 and the road wheel actuator 62 via a first independent path 68A of the ethernet communication protocol 68, and, collecting, independently, with a second electronic control unit 72B of the steering wheel actuator 56, data related to the state of the steering wheel 58, and communicating the data to the central controller 50 and the road wheel actuator 62 via a second independent path 68B of the ethernet communication protocol 68.

In another exemplary embodiment, the collecting, with a road wheel actuator 62 in communication with the central controller 50 and the steering wheel actuator 56 and having a secondary control algorithm 64 stored therein, data related to a state of the road wheel actuator 62 at block 208 further includes, one of collecting, independently, with a first electronic control unit of the road wheel actuator data related to the state of the road wheel actuator, and communicating the data to the central controller via the first independent path of the ethernet communication protocol, or collecting, independently, with a second electronic control unit of the road wheel actuator data related to the state of the road wheel actuator, and communicating the data to the central controller via the second independent path of the ethernet communication protocol, wherein, each of the first electronic control unit and the second electronic control unit of the road wheel actuator includes a copy of the secondary control algorithm stored therein.

In another exemplary embodiment, the method 200 further includes, moving to block 220, providing power to the central controller 50 from both of a first power grid 80A and a second power grid 80B, moving to block 222, providing power to the first electronic control unit 72A of the steering wheel actuator 56 and the first electronic control unit 76A of the road wheel actuator 62 from the first power grid 80A, and, moving to block 224, providing power to the second electronic control unit 72B of the steering wheel actuator 56 and the second electronic control unit 76B of the road wheel actuator 62 from the second power grid 80B, and providing power to the redundant secondary controller 54 and the tertiary steering wheel angle sensor 60 from either one of the first power grid 80A or the second power grid 80B.

In another exemplary embodiment, the method 200 further includes, moving to block 226, providing torque feedback at the steering wheel 58 during steer by wire maneuvers with a feedback motor 86 connected to the steering wheel 58 via a gear box 88, in communication with the steering wheel actuator 56 and controlled by one of the first electronic control unit 72A of the steering wheel actuator 56 and the second electronic control unit 72B of the steering wheel actuator 56, and, moving to block 228, providing, with the feedback motor 86, passive feedback at the steering wheel 58 to provide resistance and dampening of the steering wheel 58 when the feedback motor 86 is not powered.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A steer by wire steering system, comprising: a central controller having a primary control algorithm stored therein; a steering wheel actuator in communication with the central controller and adapted to collect data related to a state of a steering wheel and communicate the data to the central controller; a tertiary steering wheel angle sensor in communication with a redundant secondary controller and configured to collect data related to the state of the steering wheel independently of the steering wheel actuator and communicate the data to the redundant secondary controller; a road wheel actuator in communication with the central controller and the steering wheel actuator, having a secondary control algorithm stored therein, and configured to: collect data related to a state of the road wheel actuator and communicate the data to the central controller; and one of: control a steering rack and steering of the vehicle based on instructions received from the central controller using the primary control algorithm; or control a steering rack and steering of the vehicle based on instructions received from redundant secondary controller using the secondary control algorithm.

2. The system of claim 1, wherein: the steering wheel actuator, the road wheel actuator, the central controller and the redundant secondary controller are configured to communicate with one another via a first communication protocol; and the redundant secondary controller, the tertiary steering wheel angle sensor and the road wheel actuator are adapted to communicate with one another via a second communication protocol that is independent from the first communication protocol.

3. The system of claim 2, wherein the first communication protocol is an ethernet communication protocol.

4. The system of claim 3, wherein the second communication protocol is one of a Controller Area Network (CAN) or Local Interconnect Network (LIN) communication protocol.

5. The system of claim 4, wherein the steering wheel actuator includes: a first electronic control unit configured to independently collect data related to a state of the steering wheel and communicate the data to the central controller and the road wheel actuator via an first independent path of the ethernet communication protocol; and a second electronic control unit configured to independently collect data related to a state of the steering wheel and communicate the data to the central controller and the road wheel actuator via a second independent path of the ethernet communication protocol.

6. The system of claim 5, wherein the road wheel actuator includes: a first electronic control unit configured to independently collect data related to a state of the road wheel actuator and communicate the data to the central controller via the first independent path of the ethernet communication protocol, and one of: control the steering rack and steering of the vehicle based on instructions received from the central controller using the primary control algorithm via the first communication protocol; control the steering rack and steering of the vehicle based on instructions received from the redundant secondary controller via the second communication protocol and using the secondary control algorithm; control the steering rack and steering of the vehicle based on instructions determined by the first electronic control unit of the road wheel actuator based on raw data received from the tertiary steering wheel angle sensor via the second communication protocol using the secondary control algorithm; or control the steering rack and steering of the vehicle based on instructions determined by the first electronic control unit of the road wheel actuator based on raw data received from steering wheel actuator via the first communication protocol; and a second electronic control unit configured to independently collect data related to a state of the road wheel actuator and communicate the data to the central controller via the second independent path of the ethernet communication protocol, and one of: control the steering rack and steering of the vehicle based on instructions received from the central controller using the primary control algorithm; control the steering rack and steering of the vehicle based on instructions received from the redundant secondary controller via the second communication protocol and using the secondary control algorithm;

control the steering rack and steering of the vehicle based on instructions determined by the second electronic control unit of the road wheel actuator based on raw data received from the tertiary steering wheel angle sensor via the second communication protocol using the secondary control algorithm; or control the steering rack and steering of the vehicle based on instructions determined by the second electronic control unit of the road wheel actuator based on raw data received from the steering wheel actuator via the first communication protocol; and wherein, each of the first electronic control unit and the second electronic control unit of the road wheel actuator includes a copy of the secondary control algorithm stored therein.

7. The system of claim 6, further including a first power grid and a second power grid independent from the first power grid, and wherein:

the central controller is powered by both of the first power grid and the second power grid;

the first electronic control unit of the steering wheel actuator and the first electronic control unit of the road wheel actuator are powered by the first power grid;

the second electronic control unit of the steering wheel actuator and the second electronic control unit of the road wheel actuator are powered by the second power grid; and the redundant secondary controller and the tertiary steering wheel angle sensor are powered by either one of the first power grid or the second power grid.

8. The system of claim 7, wherein the first power grid is connected to a first independent high voltage power source within the vehicle, and the second power grid is connected to a second independent high voltage power source within the vehicle.

9. The system of claim 7, wherein the steering wheel includes a feedback motor in communication with the steering wheel actuator and controlled by the first electronic control unit of the steering wheel actuator and the second electronic control unit of the steering wheel actuator, the feedback motor connected to the steering wheel via a gear box and adapted to:

provide torque feedback at the steering wheel; and provide passive feedback at the steering wheel to provide resistance and dampening of the steering wheel when the feedback motor is not powered.

10. The system of claim 7, wherein the road wheel actuator includes a steering motor in communication with the road wheel actuator and controlled by the first electronic control unit of the road wheel actuator and the second electronic control unit of the road wheel actuator, and a steering rack, the steering rack configured to convert rotary motion of the steering motor to linear motion of the steering rack and turn wheels of the vehicle via tie rods interconnecting the steering rack and the wheels of the vehicle.

11. The system of claim 7, wherein the central controller further includes a torque vectoring steering control algorithm stored therein, wherein the central controller is configured to:

receive data related to steering wheel from at least one of: the first electronic control unit of the steering wheel actuator via the first path of the ethernet communication protocol; the second electronic control unit of the steering wheel actuator via the second path of the ethernet communication protocol;

and the tertiary steering wheel angle sensor via the ethernet communication protocol; and actuate at least one of a brake system, a propulsion system, and the road wheel actuator to influence late.

12. The system of claim 7, further including at least one first switch configured to selectively interconnect the first path of the ethernet communication protocol to the central controller and at least one second switch configured to selectively interconnect the second path of the ethernet communication protocol to the central controller.

13. The system of claim 1, wherein the primary control algorithm includes a full set of control features and the secondary control algorithm includes a reduced set of control features.

14. A method of controlling a steer by wire steering system, comprising: collecting, with a steering wheel actuator in communication with a central controller having a primary control algorithm stored therein, data related to a state of a steering wheel, and communicating, with the steering wheel actuator, the data to the central controller; collecting, with a tertiary steering wheel angle sensor in communication with a redundant secondary controller and the central controller, data related to the state of the steering wheel independently of the steering wheel actuator, and communicating the data to the redundant secondary controller and the central controller; collecting, with a road wheel actuator in communication with the central controller and the steering wheel actuator and having a secondary control algorithm stored therein, data related to a state of the road wheel actuator; communicating, with the road wheel actuator, the data to the central controller; and one of: controlling, with the road wheel actuator, a steering rack and steering of the vehicle based on instructions received from the central controller using the primary control algorithm; controlling, with the road wheel actuator, a steering rack and steering of the vehicle based on instructions received from redundant secondary controller using the secondary control algorithm; controlling, with the road wheel actuator, a steering rack and steering of the vehicle based on instructions determined by the road wheel actuator based on raw data received from the tertiary steering wheel angle sensor via a second communication protocol using the secondary control algorithm; or controlling, with the road wheel actuator, a steering rack and steering of the vehicle based on instructions determined by the road wheel actuator based on raw data received from the steering wheel actuator via a first communication protocol.

15. The method of claim 14, further including:

enabling, with an ethernet communication protocol, communication between the steering wheel actuator, the road wheel actuator, the central controller and the redundant secondary controller; and enabling, with one of a Controller Area Network (CAN) or a Local Interconnect Network (LIN) communication protocol, communication between the redundant secondary controller, the tertiary steering wheel angle sensor and the road wheel actuator.

16. The method of claim 15, wherein the collecting, with the steering wheel actuator in communication with the central controller having the primary control algorithm stored therein, data related to the state of the steering wheel, and communicating, with the steering wheel actuator, the data to the central controller further includes:

collecting, independently, with a first electronic control unit of the steering wheel actuator, data related to the state of the steering wheel, and communicating the data to the central controller and the road wheel actuator via a first independent path of the ethernet communication protocol; and collecting, independently, with a second electronic control unit of the steering wheel actuator, data related to the state of the steering wheel, and communicating the data to the central controller and the road wheel actuator via a second independent path of the ethernet communication protocol.

17. The method of claim 16, wherein the collecting, with the road wheel actuator in communication with the central controller and the steering wheel actuator and having the secondary control algorithm stored therein, data related to a state of the road wheel actuator further includes, one of:

collecting, independently, with a first electronic control unit of the road wheel actuator data related to the state of the road wheel actuator, and communicating the data to the central controller via the first independent path of the ethernet communication protocol; or collecting, independently, with a second electronic control unit of the road wheel actuator data related to the state of the road wheel actuator, and communicating the data to the central controller via the second independent path of the ethernet communication protocol;

wherein, each of the first electronic control unit and the second electronic control unit of the road wheel actuator includes a copy of the secondary control algorithm stored therein.

18. The method of claim 17, further including:

providing power to the central controller from both of a first power grid and a second power grid;

providing power to the first electronic control unit of the steering wheel actuator and the first electronic control unit of the road wheel actuator from the first power grid;

providing power to the second electronic control unit of the steering wheel actuator and the second electronic control unit of the road wheel actuator from the second power grid; and providing power to the redundant secondary controller and the tertiary steering wheel angle sensor from either one of the first power grid or the second power grid.

19. The method of claim 18 further including:

providing torque feedback at the steering wheel with a feedback motor connected to the steering wheel via a gear box, in communication with the steering wheel actuator and controlled by the first electronic control unit of the steering wheel actuator and the second electronic control unit of the steering wheel actuator; and providing, with the feedback motor, passive feedback at the steering wheel to provide resistance and dampening of the steering wheel when the feedback motor is not powered.

20. A vehicle having a steer by wire steering system, the steering system comprising: a central controller having a primary control algorithm stored therein; a steering wheel actuator in communication with the central controller and including: a first electronic control unit configured to independently collect data related to a state of the steering wheel and communicate the data to the central controller and the road wheel actuator; and a second electronic control unit configured to independently collect data related to a state of the steering wheel and communicate the data to the central controller and the road wheel actuator a tertiary steering wheel angle sensor in communication with a redundant secondary controller and configured to collect data related to the state of the steering wheel independently of the steering wheel actuator and communicate the data to the redundant secondary controller; a road wheel actuator in communication with the central controller and the steering wheel actuator, having a secondary control algorithm stored therein, and including: a first electronic control unit having a secondary control algorithm stored therein and configured to independently collect data related to a state of the road wheel actuator and communicate the data to the central controller, and one of: control the steering rack and steering of the vehicle based on instructions received from the central controller using the primary control algorithm; control the steering rack and steering of the vehicle based on instructions received from redundant secondary controller using the secondary control algorithm; control the steering rack and steering of the vehicle based on instructions determined by the first electronic control unit of the road wheel actuator based on raw data received from the tertiary steering wheel angle sensor via a second communication protocol using the secondary control algorithm; or control the steering rack and steering of the vehicle based on instructions determined by the first electronic control unit of the road wheel actuator based on raw data received from the steering wheel actuator via a first communication protocol; and a second electronic control unit having the secondary control algorithm stored therein and adapted to independently collect data related to a state of the road wheel actuator and communicate the data to the central controller, and one of: control the steering rack and steering of the vehicle based on instructions received from the central controller using the primary control algorithm; control the steering rack and steering of the vehicle based on instructions received from redundant secondary controller using the secondary control algorithm; control the steering rack and steering of the vehicle based on instructions determined by the second electronic control unit of the road wheel actuator based on raw data received from the tertiary steering wheel angle sensor via the second communication protocol using the secondary control algorithm; or control the steering rack and steering of the vehicle based on instructions determined by the second electronic control unit of the road wheel actuator based on raw data received from the steering wheel actuator via the first communication protocol; and wherein, the steering wheel actuator, the road wheel actuator, the central controller and the redundant secondary controller are adapted to communicate with one another via an ethernet communication protocol; the redundant secondary controller, the tertiary steering wheel angle sensor and the road wheel actuator are adapted to communicate with one another via one of a Controller Area Network (CAN) or Local Interconnect Network (LIN) communication protocol that is independent from the ethernet communication protocol; the central controller is powered by both of a first power grid or a second power grid; the first electronic control unit of the steering wheel actuator and the first electronic control unit of the road wheel actuator are powered by the first power grid; the second electronic control unit of the steering wheel actuator and the second electronic control unit of the road wheel actuator are powered by the second power grid; and the redundant secondary controller and the tertiary steering wheel angle sensor are powered by either one of the first power grid or the second power grid.

* * * * *